United States Patent [19]

Tuleja

[11] 3,975,849
[45] Aug. 24, 1976

[54] REFLECTING TRIANGULAR WARNING DEVICES

[76] Inventor: Anthony Z. Tuleja, 812 Hudson Drive, Sarasota, Fla. 33577

[22] Filed: Sept. 17, 1973

[21] Appl. No.: 397,757

[52] U.S. Cl. .............................. 40/125 N; 40/129 C; 116/63 T
[51] Int. Cl.² .......................................... G09F 7/06
[58] Field of Search .......... 40/125 N, 125 H, 125 R, 40/125 F, 129 R, 129 C, 135; 116/63 P, 28, 63 T

[56] References Cited
UNITED STATES PATENTS

| | | | |
|---|---|---|---|
| 1,821,227 | 9/1931 | Mackey et al. ................... | 40/125 N |
| 2,003,126 | 5/1935 | Torstenson ...................... | 40/125 F |
| 3,096,596 | 7/1963 | Magnuson et al. .................. | 40/135 |
| 3,135,235 | 6/1964 | Romano ........................ | 116/63 P |
| 3,703,152 | 11/1972 | Morton ........................ | 40/125 N X |
| 3,766,881 | 10/1973 | Ward .......................... | 40/125 H X |

FOREIGN PATENTS OR APPLICATIONS

| | | | |
|---|---|---|---|
| 783,961 | 4/1968 | Canada ........................ | 116/63 P |
| 1,815,253 | 6/1970 | Germany ...................... | 116/63 P |

*Primary Examiner*—John F. Pitrelli
*Attorney, Agent, or Firm*—Warren E. Ray

[57] ABSTRACT

Triangular reflecting plastic warning devices having a hole at the top for hanging from a post or the rear of a slow-moving vehicle, a hole in each of the side legs for receiving the stub connectors of a removable sign with words such as HELP, S.O.S., STOP, SLOW, DANGER, KEEP OUT, a pair of holes on the lower rim of the bottom leg to permit insertion of legs with pins whereby the legs may be horizontal with a land surface or vertical to be pushed into the ground, and having a projecting arm with a hook for use with an automobile window. On the reverse side on the triangular border and on the letters on the reverse side of the removable sign are provided a plurality of 90° apex angle cones for wide angle parallel ray reflection effective during daylight hours as well as at night. The letters are sunken with respect to the front surface of the sign to permit painting or silk screening with a different color to make the letters stand out without covering the reflecting letters.

2 Claims, 17 Drawing Figures

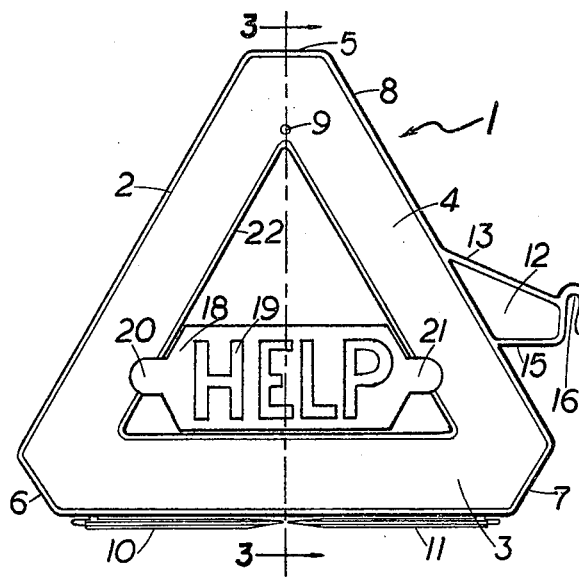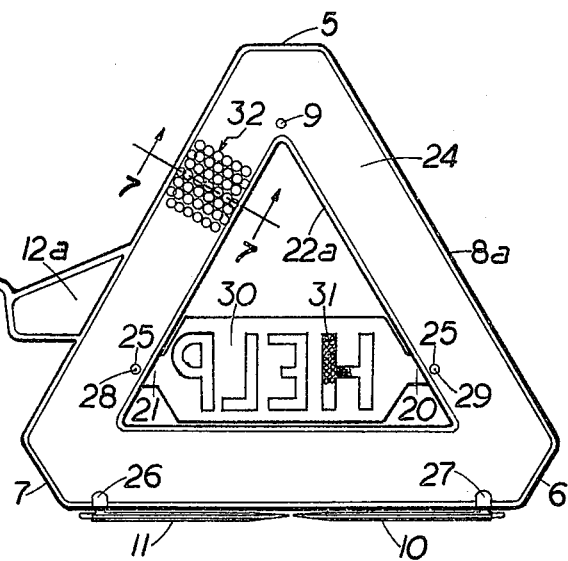
FIG.1  FIG.2
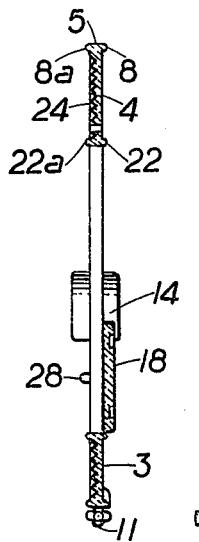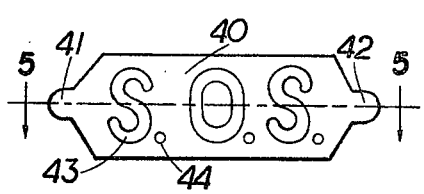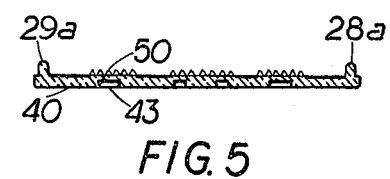
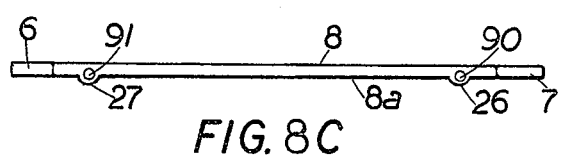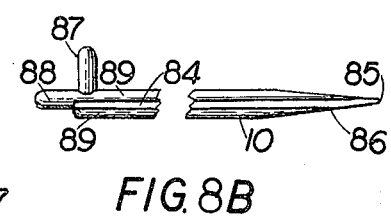
FIG.3  FIG.4  FIG.5  FIG.8C  FIG.8B
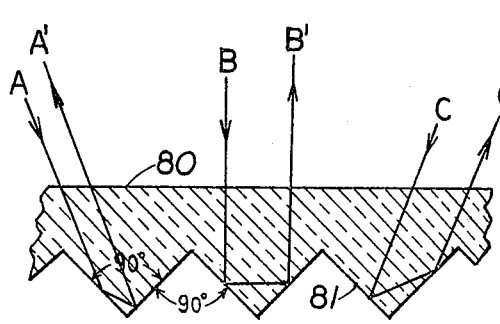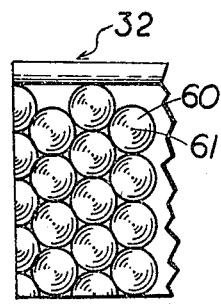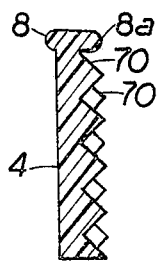
FIG.8A  FIG.6  FIG.7

REFLECTING TRIANGULAR WARNING DEVICES

CROSS-REFERENCE TO RELATED APPLICATIONS

There are no related pending applications.

BRIEF SUMMARY OF THE INVENTION

This invention relates to reflecting plastic triangular warning devices with diverse interchangeable signs which includes those useful for safety purposes on the highways.

The primary object is the provision of a basic triangular structure adaptable to many uses such as on a car window, on the ground with a pair of legs that may be horizontal with a surface or vertical thereto, on a slow-moving vehicle, or on a post, etc. Interchangeable signs adapt the basic structure for various purposes whereby an individual may purchase only those signs likely to be useful to him.

It is a further object to provide effective warning signs that are relatively simple (e.g., as compared with road flares), reliable, economical, capable of reuse many times, and storable under the front seat of an automobile.

Other objects and advantages will clearly appear from a description of the preferred embodiments as shown in the accompanying drawings, in which:

BRIEF DESCRIPTION OF THE SEVERAL VIEWS OF THE DRAWINGS

FIG. 1 is a front view of the basic device with a removable sign for HELP;

FIG. 2 shows the reverse side of the FIG. 1 device;

FIG. 3 is a cross sectional view taken on the lines 3—3 of FIG. 1;

FIG. 4 depicts the front of an alternate sign with letters S.O.S.;

FIG. 5 is a horizontal cross sectional view of the sign in FIG. 4 taken on the lines 5—5;

FIG. 6 illustrates an enlarged detail of the conical prisms of FIG. 2;

FIG. 7 is a partial cross sectional view of the prism area 32 taken on the lines 7—7 of FIG. 2;

FIG. 8A shows the manner in which incident rays are reflected in a parallel direction;

FIG. 8B depicts a supporting leg such as used in FIGS. 1-2 and 13-15;

FIG. 8C is a bottom view of FIG. 1;

DETAILED DESCRIPTION

Figure 12:
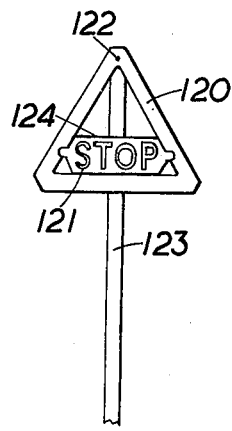
FIG. 12 shows another application of the sign STOP affixed to a post.
Figure 13:
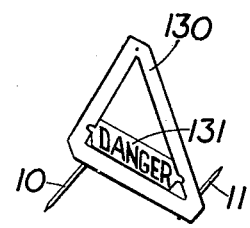
FIG. 13 is another illustration of use of the sign DANGER on a surface as a highway.
Figure 14:
FIG. 14 is still another application of the sign KEEP OUT on the border of posted property.

FIG. 1 is a front view of the basic device indicated generally by the numeral 1 wherein 2, 3, 4 are the left, bottom, and right sections of a triangle, respectively. The vertices of the triangle are shortened at 5, 6, 7 with an outer rim 8 and an inner rim 22 on the front side. A hole 9 is provided at the upper part of the device for use in the event it becomes desirable to hang the device on a post as in FIG. 12 or on a slow-moving vehicle as a tractor in FIG. 11. The legs 10, 11, more particularly described hereinafter, may be used as horizontal supports as shown in FIGS. 13 and 14 (see also FIGS. 8B, 8C). A projecting arm 12 with rims 13, 15 may be integral with leg 4 with an outer portion resembling a hook 14 having an inner surface 16 for attaching the sign to a car window (see FIGS. 9, 10). The sign with front surface 18 with letters 19, here the letter H as exemplary of several letters, the letters being depressed or sunken below the front surface 18 permitting painting or silkscreening with a contrasting color without obscuring the letters, has ears 20, 21 for a purpose which will be set forth in connection with FIGS. 2–5. The triangle 1 has a central space which also is in the shape of a triangle.

The reverse side of the triangle of FIG. 1 is shown in FIG. 2 wherein 5, 6, 7 indicate the shortened triangle vertices, 8a is the outer rim on all sides, 9 is the hole through the upper part, and 10, 11 are the supporting legs. The reverse side of the projecting arm 12 is indicated at 12a, 14 is the outer portion of the hook thereon, and 20, 21 are the ears on the sign, the ears having press fit connecting stubs 28, 29 mating with the holes 25 through the triangle legs 2, 4. An inner rim is provided at 22a similar to the front inner rim 22, and 24 indicates the reverse surface of the triangle legs. The protuberances 26, 27 provide part of the walls for the holes in the bottom leg 3 for receiving stub pins on the legs 10, 11 as will be described hereinafter. On the reverse side 30 of the sign the letters are provided with reflecting cones or prisms as indicated at 31, it being understood that the cones are provided on each letter. Generally indicated at 32 are similar reflecting cones, it also being understood that such cones extend completely around the triangle on the reverse side.

Turning now to FIG. 3, a cross sectional view taken on the lines 3—3 of FIG. 1, 3 is the bottom front side of the triangle, 4 is the right front leg of the triangle, and 5 is the top shortened triangle vertex. The numerals 8, 8a indicate the front outer rim and the reverse outer rim of the triangle structure. At 11 is seen the right supporting leg and 14 indicates the hook portion. The sign 18 has a right connecting stub 28 passing through the hole 25 and is visible at the left of the figure (reverse side of the device). The front inner rim 22 and the reverse side inner rim 22a are also seen in this figure, it being understood that the rims extend completely around the inner and outer edges of the triangle. As in FIG. 2, the numeral 24 indicates the reverse side of all triangle legs.

FIG. 4 illustrates an alternative sign, in all respects similar to that in FIGS. 1–3, except that the letters S.O.S. are substituted for the letters HELP. The front surface is 40, the ears are 41, 42, 43 indicates the letter S as exemplary of other letters, and 44 indicates one of the periods (which may be omitted if desired). The letters are sunken with respect to surface 40 as indicated at 43 in FIG. 5 which is a cross sectional view of FIG. 4 taken on lines 5—5. On the ears 41, 42 are provided connecting stub pins 28a, 29a similar to stub connectors 28, 29 shown in FIG. 2, that pass through holes 25 and retain the sign in position. The letter reflecting cones at 50 are identical to cones 31 shown in FIG. 2.

FIG. 6 is a partial detail showing of the cones 32 in FIG. 2 wherein 60 is an individual cone with 90° apex angle at 61. FIG. 7 is a partial cross sectional view of the reflecting cones taken on lines 7—7 of FIG. 2. On the reverse side 24 opposite the incident surface 4 are indicated a plurality of cones 70 having cone apex angles of 90° and of necessity having a 90° angle between adjacent cones as indicated. The front and back outer rims are indicated at 8 and 8a. A better understanding why reflecting cones or prisms are preferred will be had by reference to FIG. 8A wherein incident rays A, B, C passing through the transparent plastic front surface 80 strike the internal cone surfaces (one cone being indicated at 81) and are reflected back as rays A', B', and C' substantially parallel to the incident rays. It will be understood that small variations from the 90° angles indicated in this figure will not substantially reduce the utility of the device. The reflecting cones are the same on both the triangular structure and on the letters. It will be noted that FIG. 7 is cross-hatched to indicate that the preferred material is a plastic.

Considering FIGS. 8B and 8C together, FIG. 8B shows one of the legs depicted in FIGS. 1–3, namely the left supporting leg 10, in more detail. The semicircular rib 84 extends almost the entire length of the leg 10 with strengthening flanges 89, 89 extending at right angles therefrom. One end of the leg is pointed at 85 with an angled portion 86 for easy insertion into the ground when used as a vertical leg. Each leg 10, 11 is provided with a horizontal stub pin 87 and a vertical stub pin 88 for use as indicated in FIGS. 13, 14. FIG. 8C is a bottom view of FIG. 1 (omitting the projecting arm 12 for simplicity) wherein the bottom triangle leg 3 is provided with holes 90, 91 to receive either the leg stub pin 87 or the leg stub pin 88. The lower shortened triangle vertices 6, 7 are shown along with front and back outer rims 8, 8a. The protuberances 26, 27 (see also FIG. 2) are necessary to provide part of the walls for holes 90, 91.

Figure 9:
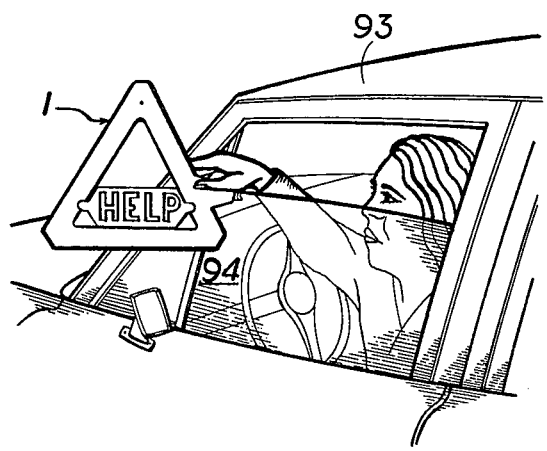
FIG. 9 shows how the sign is placed on a partially opened car window.
Figure 10:
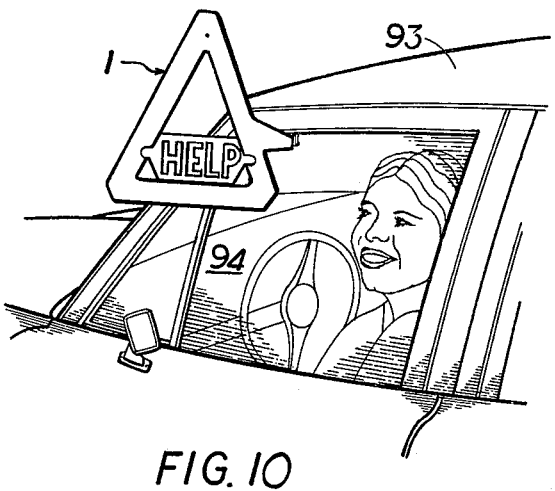
FIG. 10 is similar to FIG. 9 wherein the car window is rolled up.

A stranded motorist desiring HELP may place the device 1 on the upper edge of a car window 94, as in FIG. 9, and roll up the window (and perhaps locking the door) as in FIG. 10. Thus, a driver in car 93 stranded on the road in a dangerous neighborhood need not open the door or roll down the window until convinced that proffered help is indeed bonafide and not a prelude to a robbery attempt.

Figure 11:
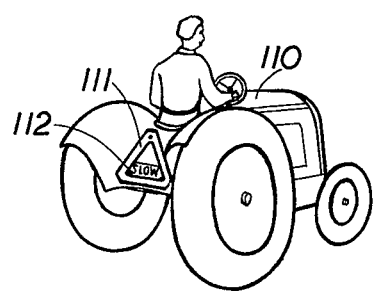
FIG. 11 illustrates use of the triangular device with an insert sign SLOW on a slow-moving vehicle such as a tractor.

FIG. 11 shows a slow-moving vehicle, e.g., a tractor 110, with the triangular basic triangle 111 having a sign insert 112 reading SLOW. The sign insert 112 is in all respects except the lettering the same as in the HELP insert heretofore described and others hereinafter mentioned. It will be understood that the triangle need not have the projecting arm 12 and hook 14 as shown in FIGS. 1, 2, 9, and 10, although its presence would not detract from its usefulness. The device would be attached to the tractor by means of a screw or even a piece of wire using the hole 9 (FIG. 1). The same remarks apply to FIG. 12 wherein the triangle device 120 with a sign insert 124 having lettering 121, here the letter S in the word STOP, is affixed to a post 123 by means of a screw or nail 122.

FIGS. 13 and 14 illustrate the use of the triangular warning device outside of a vehicle or on the ground. In FIG. 13 the HELP sign in triangle 130 is replaced with a sign 131 having the letters for DANGER, and in FIG. 14 the HELP sign in triangle 140 is replaced with a sign 141 having the letters for KEEP OUT. In FIG. 13 the legs 10, 11 are used in a horizontal position by inserting horizontal stub pins 87 in the bottom rim holes 90, 91. In FIG. 14 the legs 10, 11 are utilized in the vertical position with the vertical stub pins 88 being inserted into the holes 90, 91 whereby the pointed ends 85 of the legs may be pushed into the ground. As with FIGS. 11, 12 the devices in FIGS. 13, 14 need not have the projecting arm 12 with hook 14, but the same would not interfere with the utility of the devices.

Figure 15:
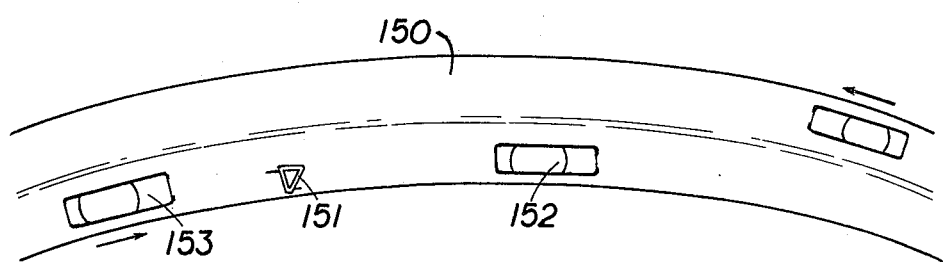
FIG. 15 depicts the use of the device on the highway by a stranded motorist. Similar reference numerals are applied to similar elements throughout the drawings.

In the event that a stalled automobile could not be moved to the shoulder and off of the highway 150 in FIG. 15, the driver of a stalled automobile 152 could place the warning device 151 a sufficient distance behind his car so as to warn approaching motorists, as the driver of car 153, of the hazard. In this instance the sign insert would be that of FIG. 13 reading DANGER as a substitute for the usual flare or lantern.

While not limited to any particular dimensions, the length of a triangle side measured along the centerline from one shortened vertex to another may be 12 inches, the inside leg of the triangle may be about 8 inches, and the width of any leg may be in the order of 1½ inches. The holes may be about 3/16 inches in diameter, and there may be 7 reflecting cones in any line across any triangle leg. The removable signs may be 7⅞ inches measured from ear to ear and about 2½ inches wide. A suitable length of the legs is about 6½ inches. The arm and hook may be 3½ inches long, and the width of the hook portion may be about ½ inch.

The material used for making the triangular devices is preferably a clear transparent plastic, as styrene, acrylic plastic, and similar plastics, for ease in producing the various components by injection molding. Various colors may be used as red, orange, yellow, etc., but red is preferred because that color is readily identified as connoting danger or emergency. The paint over the sign insert without obscuring the sunken letters may be white in color to provide a contrast with the red color of the plastic. Many words of warning other than those mentioned supra will readily occur to those skilled in the art. While the reflecting prisms preferably are cones as described for wide angle reflection providing maximum visibility, it will be understood that pyramidal prisms, for example, could be utilized.

While for the purpose of description I have shown and described specific embodiments of my invention, it will be apparent that changes and modifications can be made therein without departing from the spirit of my invention or the scope of the appended claims.

I claim:

1. A reflecting warning device comprising triangular structure including a left leg, a right leg, and a bottom leg means joined together, a hole through said left leg and said right leg means adjacent the lower end thereof, an insertable warning sign means, a pair of stub connectors on the back of said warning sign means, said stub connectors on said warning sign means being insertable into said left and right leg holes whereby said warning sign means is removably affixed to said triangular structure, said warning sign means including thereon letters to make the warning sign intelligible, said triangular structure and said insertable sign means being made of plastic material, and light ray reflecting prisms on the reverse side of said legs and on the reverse side of said warning sign letters, said bottom leg means includes a pair of holes on the bottom rim thereof, one adjacent each end thereof, and a pair of supporting legs, each of said supporting legs having adjacent one end thereof a first stub pin perpendicular to said leg and a second stub pin as a longitudinal extension of said leg, said supporting leg stub pins being insertable in said bottom leg rim holes whereby said supporting legs are in a plane substantially perpendicular to said triangular structure.

2. A reflecting warning device comprising triangular structure including a left leg, a right leg, and a bottom leg means joined together, a hole through said left leg and said right leg means adjacent the lower end thereof, an insertable warning sign means, a pair of stub connectors on the back of said warning sign means, said stub connectors on said warning sign means being insertable into said left and right leg holes whereby said warning sign means is removably affixed to said triangular structure, said warning sign means including thereon letters to make the warning sign intelligible, said triangular structure and said insertable sign means being made of plastic material, and light ray reflecting prisms on the reverse side of said legs and on the reverse side of said warning sign letters, said bottom leg means includes a pair of holes on the bottom rim thereof, one adjacent each end thereof, and a pair of supporting legs, each of said supporting legs having adjacent one end thereof a first stub pin perpendicular to said leg and a second stub pin as a longitudinal extension of said leg, said supporting leg stub pins being insertable in said bottom leg rim holes whereby said supporting legs are substantially in a vertical plane with respect to said triangular structure.

* * * * *